United States Patent
Wittenschlaeger et al.

(10) Patent No.: US 10,356,049 B2
(45) Date of Patent: *Jul. 16, 2019

(54) FABRIC-BASED ANONYMITY MANAGEMENT, SYSTEMS AND METHODS

(71) Applicant: Nant Holdings IP, LLC, Culver City, CA (US)

(72) Inventors: Thomas Wittenschlaeger, Flowery Branch, GA (US); Nicholas Witchey, Laguna Hills, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/979,270

(22) Filed: May 14, 2018

(65) Prior Publication Data

US 2018/0351916 A1    Dec. 6, 2018

Related U.S. Application Data

(63) Continuation of application No. 15/587,857, filed on May 5, 2017, now Pat. No. 9,973,476, which is a
(Continued)

(51) Int. Cl.
*H04L 29/06* (2006.01)
*G06F 21/00* (2013.01)
(Continued)

(52) U.S. Cl.
CPC ........ *H04L 63/0281* (2013.01); *G06F 21/602* (2013.01); *H04L 9/0631* (2013.01);
(Continued)

(58) Field of Classification Search
CPC ............. H04W 68/02; H04W 72/1226; H04W 72/1215; H04W 92/04
See application file for complete search history.

(56) References Cited

U.S. PATENT DOCUMENTS 6,266,704 B1    7/2001  Reed et al.
6,802,068 B1   10/2004  Guruprasad
(Continued)

FOREIGN PATENT DOCUMENTS

EP    1014744 A2    6/2000
EP    1586185 A1   10/2005
(Continued)

OTHER PUBLICATIONS

Karlsruhe Institue of Technology, "Combs of light accelerate communication." Phys.org Apr. 14, 2014,http://phys.org/news/2014-04-combs-of-light-accelerate-communication.html-.
(Continued)

*Primary Examiner* — Lisa C Lewis
(74) *Attorney, Agent, or Firm* — Mintz Levin Cohn Ferris Glovsky and Popeo, P.C.

(57) ABSTRACT

Based on a hidden service address table stored in a memory, a virtual circuit related to a hidden service is mapped to a corresponding port-level channel based on the hidden service's address. Data associated with the hidden service is routed between the virtual circuit and the port-level channel. This enables binding of high level anonymity protocols to low level communication services of a network fabric and ensures that other nodes in the network fabric can leverage fabric-hosted hidden services without requiring updates to an existing anonymity protocol.

23 Claims, 3 Drawing Sheets

Related U.S. Application Data continuation of application No. 14/685,564, filed on Apr. 13, 2015, now Pat. No. 9,680,798.

(60) Provisional application No. 61/978,613, filed on Apr. 11, 2014.

(51) Int. Cl.
  *G06F 21/60* (2013.01)
  *H04L 9/06* (2006.01)
  *H04L 12/743* (2013.01)

(52) U.S. Cl.
  CPC ...... *H04L 45/7453* (2013.01); *H04L 63/0421* (2013.01); *H04L 63/0442* (2013.01); *H04L 63/0464* (2013.01); *H04L 63/061* (2013.01); *H04L 63/0876* (2013.01)

(56) References Cited

U.S. PATENT DOCUMENTS

| | | | |
|---|---|---|---|
| 6,944,656 B2 | 9/2005 | Evrard et al. | |
| 6,990,110 B2 | 1/2006 | Nattkemper et al. | |
| 7,099,944 B1* | 8/2006 | Anschutz | H04L 12/5692 370/352 |
| 7,107,619 B2 | 9/2006 | Silverman | |
| 7,203,190 B1 | 4/2007 | Ruban | |
| 7,352,745 B2 | 4/2008 | Perera et al. | |
| 7,457,967 B2 | 11/2008 | Cocchi et al. | |
| 7,548,556 B1 | 6/2009 | Wittenschlaeger | |
| 7,685,275 B2 | 3/2010 | Pitkow et al. | |
| 7,814,546 B1* | 10/2010 | Strayer | H04L 63/1416 726/23 |
| 7,865,715 B2 | 1/2011 | Xu et al. | |
| 7,904,539 B2 | 3/2011 | Dale et al. | |
| 7,996,891 B2 | 8/2011 | Cardone et al. | |
| 8,015,283 B2 | 9/2011 | Seidel | |
| 8,341,211 B2 | 12/2012 | Dale et al. | |
| 8,370,627 B2 | 2/2013 | Yamazaki et al. | |
| 8,407,743 B2* | 3/2013 | Suh | H04N 21/235 370/395.52 |
| 8,566,928 B2 | 10/2013 | Dagon et al. | |
| 8,583,922 B2 | 11/2013 | Kahn | |
| 8,655,977 B2 | 2/2014 | Dale et al. | |
| 9,110,355 B1* | 8/2015 | Nourbakhsh | G03B 15/05 |
| 2001/0030969 A1* | 10/2001 | Donaghey | H04L 45/02 370/397 |
| 2002/0044567 A1 | 4/2002 | Voit et al. | |
| 2003/0012184 A1 | 1/2003 | Walker et al. | |
| 2009/0216910 A1 | 8/2009 | Duchesneau | |
| 2010/0002882 A1 | 1/2010 | Rieger et al. | |
| 2012/0166582 A1 | 6/2012 | Binder | |
| 2012/0166601 A1 | 6/2012 | Wittenschlaeger | |
| 2016/0380812 A1* | 12/2016 | Chanda | H04L 41/0803 709/220 |

FOREIGN PATENT DOCUMENTS

| | | |
|---|---|---|
| EP | 1826986 A1 | 8/2007 |
| JP | 2007005898 A | 1/2007 |
| WO | WO-9963689 A1 | 12/1999 |
| WO | WO-0214977 A2 | 2/2002 |
| WO | WO-02078316 A2 | 10/2002 |
| WO | WO-2013186061 A1 | 12/2013 |

OTHER PUBLICATIONS

L. Overlier & P. Syverson. "Improving efficiency and simplicity of Tor circuit establishment and hidden services." Proc. Seventh Symposium on Privacy Enhancing Tech (PET 2007), V. 4776 of Lecture Notes in Comp. Sci, pp. 134-152. Springer, Jun. 2007.

M.G. Reed, et al. "Proxies for Anonymous Routing." 12th Annual Computer Security Applications Conference, San Diego, CA, Dec. 9-13, 1996.

R. Dingledine, et al. "Tor: The Second-Generation Onion Router." Proceedings of the 13th USENIX Security Symposium, San Diego, CA, USA, Aug. 9-13, 2004.

Tor Project. "Tor Project: Overview." TorProject.org website. Published at https://www.torproject.org/about/overview.html.en.

Tor Project. "Tor: Hidden Service Protocol." TorProject.org website. Published at https://www.torproject.org/docs/hidden-services.html.en.

* cited by examiner

FABRIC-BASED ANONYMITY MANAGEMENT, SYSTEMS AND METHODS

CROSS REFERENCE TO RELATED APPLICATIONS

This Application is a continuation of application Ser. No. 15/587,857 filed on May 5, 2017, entitled "FABRIC-BASED ANONYMITY MANAGEMENT, SYSTEMS AND METHODS," which is a continuation of application Ser. No. 14/685,564 filed on Apr. 13, 2015, entitled "FABRIC-BASED ANONYMITY MANAGEMENT, SYSTEMS AND METHODS," which claims the benefit of U.S. Provisional Application 61/978,613 filed Apr. 11, 2014, entitled "FABRIC-BASED ANONYMITY MANAGEMENT, SYSTEMS AND METHODS." The entire contents of these applications are incorporated herein by reference in their entirety.

FIELD OF THE INVENTION

The field of the invention is network fabric technologies.

BACKGROUND

The background description includes information that may be useful in understanding the present invention. It is not an admission that any of the information provided herein is prior art or relevant to the presently claimed invention, or that any publication specifically or implicitly referenced is prior art.

Secure communications on public or private networks continues to be a great concern to data communication stakeholders. Various governments, financial institutions, corporate entities, and other parties seek to ensure their data communications are secure against threats through various encryption technologies (e.g., SSL, SSH, HTTPS, AES, etc.). The desire for secure communications is not restricted to just large-scale entities, but applies to end users who also wish to keep their network activities secure or anonymous.

One approach that has arisen over the last decade and seeks to provide secure, anonymous communications includes securing data packets in layers of encryption based on the number of hops that packets take over a communication network path. Such an approach is commonly referred to as "onion routing" because each hop in the network adds a new layer of encryption. The Tor Project (see URL torproject.org) provides open source software and packages that allow developers to create secure anonymous TCP/IP applications. For example, The Tor Project offers a browser bundle that allows end users to browse the web in an anonymous manner via a network of Tor nodes.

The Tor Project also provides support for the creation and consumption of hidden services. The hidden services represent servers that provide network services (e.g., FTP, HTTP, etc.) and that have unknown, or hidden IP addresses, to the edge device. Such hidden services are accessible only through a complicated hidden service protocol.

Unfortunately, Tor has numerous limitations and weakness. One limitation is that Tor, at the time of this writing, only supports TCP/IP over an IPv4 network. Although useful, the migration of the Internet to IPv6 would place Tor at a disadvantage. It is noted that effort is underway to port Tor to IPv6. However, the completion of the port is far off in time. Tor also operates via a network of nodes comprising general purpose computers having allocated IP addresses (e.g., servers, home computers, etc.). Thus, Tor is only able to provide communications among participating edge device IP addressable peers, which can expose participating nodes to observation via ISPs or other threats. This risk of exposure is very real with respect to hidden services. It would be more desirable to provide access to hidden services while reducing the risk of exposing those services and also maintaining compatibility with existing Tor protocols.

U.S. Pat. No. 6,266,704 to Reed et al. titled "Onion Routing Network for Security Moving Data through Communication Networks", filed May 29, 1998, describes the original method by which the Tor project operated. In 2004, the Tor Project altered the Tor protocol to avoid onion routing due to several issues. The new version of the Tor protocol leverages telescoping path building as described in the paper to Dingledine et al. titled "Tor: The Second-Generation Onion Router" (The Proceedings of the $13^{th}$ USENIX Security Symposium, Aug. 9-13, 2004). Even with the change from onion routing to telescoping path building, the issues discussed above remain because all peers or nodes that host hidden services in a Tor network can be discovered due to being edge devices.

Others have put forth effort to address various issues associated with onion routing, including the efforts described in U.S. Pat. No. 8,370,627 to Yamazaki et al. titled, "Confidential Communication Method", filed internationally on Dec. 30, 2008. Yamazaki seeks to make anonymous communication channels robust against slow traffic or node failure. A client is able to determine if routes to information sources relate to the client while ensuring the information source remains hidden. Although useful for ensuring that communication channels are solid and reliable, Yamazaki fails to address the issue that hidden services are hosted on edge devices that can be observed.

There are quite a number of varied uses of Tor-like anonymous networks. One example includes those described by U.S. Pat. No. 7,996,891 to Cardone et al. titled, "Systems, Methods, and Computer Program Products for Generating Anonymous Assertions," filed Jan. 30, 2008. Cardone leverages an onion routing network to present assertion tokens from devices in an anonymous manner. Another example includes U.S. patent application publication 2010/0002882 to Reiger et al. titled, "Method and Device for Anonymous Encrypted Mobile Data Speech Communication", filed Jul. 17, 2008. Reiger discusses using hidden services via hidden circuits to provide for secure communications. Yet another example includes the privacy communication system described in International Patent application publication WO 2013/186061 to Nandi et al. titled, "Architecture of Privacy Protection System for Recommended Services", filed May 31, 2013. Nandi also uses Tor-based networks and hidden services. As with the previous examples, Nandi also merely instantiates hidden services nodes on edge devices Hidden services in a Tor network are accessed through virtual circuits established among a set of Tor peers at the IP layer. Data is exchanged between an edge device and the hidden service through an exchange of fixed sized "cells;" data segments having 512 bytes. The virtual circuits run over a packet switched network from one node to another while satisfying a hop requirement. Such an approach is adequate when all nodes are edge devices on the network, but exposes the hidden service to threats as discussed above as well as incurring latency costs.

The virtual circuits leveraged by Tor have some similarity to virtual circuits used by asynchronous transfer mode (ATM) networks that establish virtual circuits between endpoints before communication begins (e.g., permanent virtual circuits, switched virtual circuits, etc.). U.S. patent application publication 2003/00012184 to Walker III et al. titled, "Integrated Access Device," filed Jul. 9, 2002, describes various devices for use in an ATM network. Virtual circuits have also be used in packet switched networks as discussed in U.S. patent application publication 2001/0030969 to Donaghey et al. titled, "Systems and Methods for Implementing Global Virtual Circuits in a Packet-Switched Networks", filed Nov. 30, 2000. Although virtual circuits have been used outside of Tor-like networks, such virtual circuits also fail to protect the anonymity of hidden services.

Thus, there remains considerable need for systems or methods by which hidden services can be deployed within a network fabric in a manner that protects the anonymity of the hidden services while also respecting established anonymity protocols; Tor for example, that the no known effort has been directed to integrating anonymous Tor-like networks directly into network fabric devices.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY

The inventive subject matter includes apparatus, systems and methods in which a network fabric can provide hidden services while reducing the risk of exposure to anonymous parties. One aspect of the inventive subject matter includes a network fabric device that can operate as a peer within a distributed network fabric. Contemplated network fabric devices can include a plurality of network ports through which a router module directs traffic flow among other network devices. The network device also includes a memory configured to store one or more tables of information. More specifically, the memory can store a port-forwarding table according to which the router module can route traffic, and store a hidden service address table. The hidden service address table can include virtual circuit end-points that map a hidden service address, possibly hosted on the fabric itself, to a port-level channel (e.g., a specific optic fiber port and a specific wavelength on the optic fiber port). In addition to routing general data packet traffic among ports according to the port-forwarding table, the router module is further configured to map one or more virtual circuits related to a hidden service to port-level channels according to the hidden service address table. The routing module is also configured to route data associated with the hidden service between the virtual circuit and corresponding port-level channels. Some embodiments also include a hidden service manager module that is configured to host the hidden service, or a portion of the hidden service, on the network fabric. Still further, the network fabric device can also include one or more cryptographic modules (e.g., FPGA, ASIC, GPUs, etc.) configured to secure network data as it passes through or to the hidden service.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
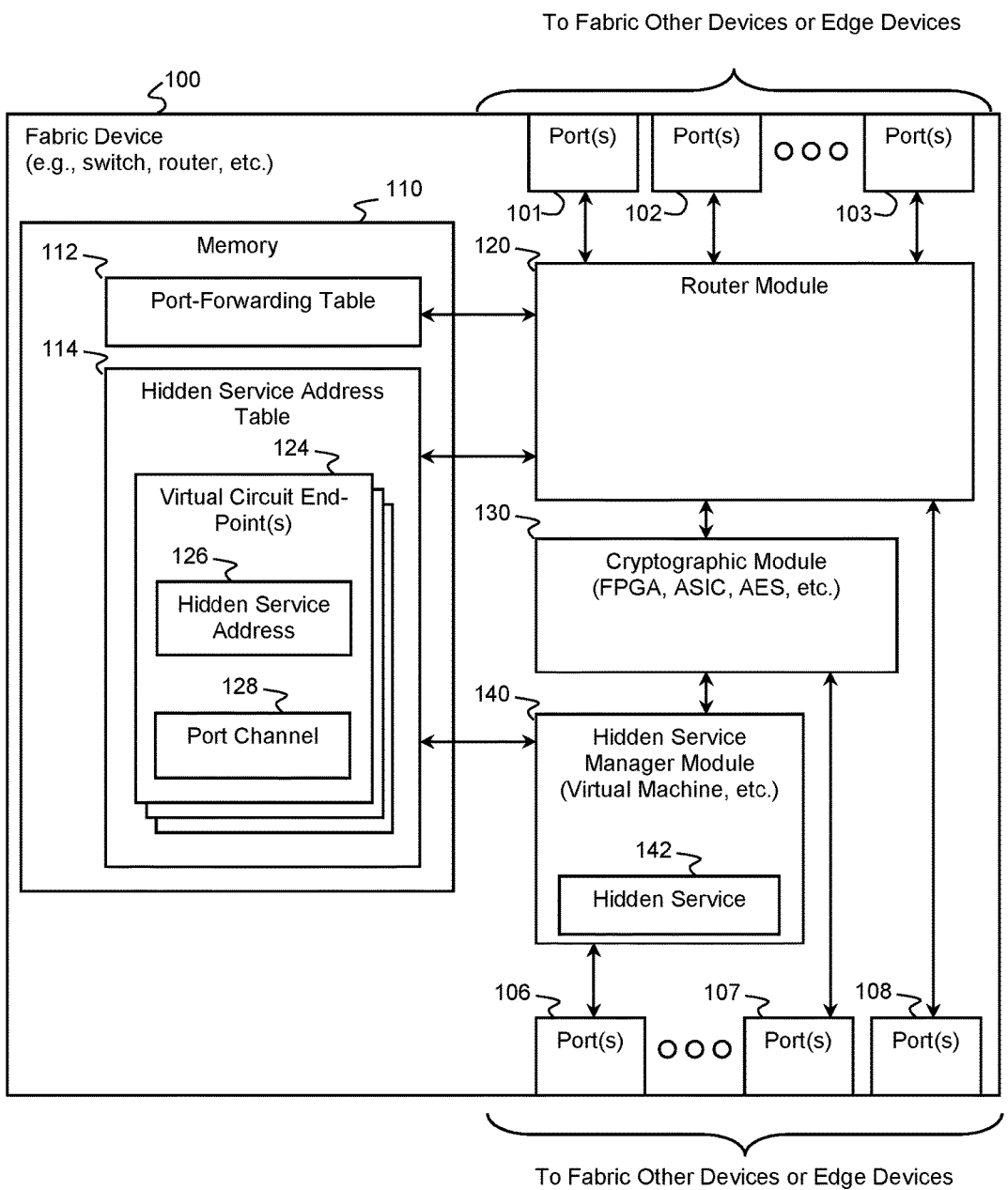
FIG. 1 is a schematic of a network fabric devices configured to host hidden services as well as route traffic from hidden service virtual circuits over port-level channels.

It should be noted that any language directed to a computer should be read to include any suitable combination of computing devices, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

One should appreciate that the disclosed techniques provide many advantageous technical effects including a packet processing device that routes packet switched traffic associated with an anonymity protocol over port-level channels. Such an approach reduces latency of the traffic while respecting the edge-node anonymity protocols. Further, anonymous hidden services have reduced exposure to detection or external threats.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Overview

The Tor anonymity protocol allows edge devices to access each other in an anonymous manner by establishing virtual circuits among Tor nodes. The virtual circuits comprise a number of hops where each hop in the virtual circuit causes the traffic over the circuit to be encrypted by an additional layer of encryption. The following discussion describes techniques by which a network fabric device can augment access to anonymous hidden services. The disclosed anonymity protocol-aware fabric devices can operate as virtual circuit end-point in a transparent manner to edge devices that participate in the anonymity network. Hidden services remain hidden and have reduced exposure to external threats. The following discussion presents the inventive subject matter from the perspective of Tor. However, it should be appreciated that the techniques could be adapted for use with other anonymity protocols (e.g., BitTorrent to some degree, Bitmessage, Freenet, GNUnet, Osiris, Perfect Dark, StegoShare, Syndie, Invisible Internet Project (I2P), etc.).

Anonymity Protocol Aware Fabric Device

FIG. 1 presents a network fabric device 100 that has been configured or programmed to be aware of one or more anonymity protocols; Tor for example. The network fabric device 100 is considered a network infrastructural device that provides network connectivity among other, possibly fungible, fabric devices, and especially among edge devices (e.g., computers, laptops, servers, cloud-platforms, cell phones, etc.). Example fabric devices include switches, routers, gateways, or other devices that support packet routing or switching capabilities.

In accordance with some aspects of the inventive subject matter, the fabric device 100 comprises a plurality of network ports (e.g., ports 101-103 and 106-108). The network ports 101-103 and 106-108 could include wired ports (e.g., Ethernet ports, USB ports, etc.), or wireless ports (e.g., Bluetooth, 802.11, WiGIG, WiMAX, etc.). Exemplary network ports include optic fiber ports (e.g., HiGIG ports, HiGIG+, HiGIG2, etc.). Ports that support port-level channels allow the network fabric device 100 to exchange data with other connected devices via one or more specified channels over the same port. For example, in embodiments where the ports 101-103 and 106-108 comprise optic fiber ports (e.g., as offered by Ciena® or Infinera®), the port-level channels could include a wavelength of light as a channel. For Ethernet ports, the port-level channels could include a MAC address of the Ethernet port. In accordance with some aspects in which network fabric devices represent an infrastructural network device, the ports 101-103 and 106-108 preferably support high-throughput data exchanges. Thus the ports 101-103 and 106-108 could include 10 Mbps ports for local area networks, 100 Mbps ports, 1000 Mbps ports for larger networks, or even 10 Gbps for high performance computing or distributed networks.

The network fabric device 100 further comprises a memory 110 (e.g., RAM, FLASH, SSD, HDD, etc.) configured to store one or more routing tables. In the example shown, the memory 110 of the fabric device 100 stores two tables 112 and 114. The first table 112 comprises a port-forwarding table that includes information on paths available over a network fabric. In some embodiments, the port-forwarding table 112 includes all existing established paths at the port-level. The information allows the device 100 to determine how to route data packets arriving on a first port (i.e., ingress port) to a departing port (i.e., egress port). The port forwarding table 112 can be a path image file that includes an image of paths available in the fabric. The port forwarding table 112 can be updated periodically in a secure fashion to secure data transmission in the fabric as discussed in the applicant's own work, U.S. Pat. No. 7,548,556 to Wittenschlaeger, titled, "Secure Communication Through a Network Fabric", filed Jun. 25, 2008.

The second table 114, and more germane to the inventive subject matter, can include a hidden service address table, which includes endpoints 124 for virtual circuits associated with one or more hidden services. Within the context of a Tor network, the virtual circuit endpoints 124 can be considered addresses of Tor nodes (e.g., relays, introduction points, rendezvous points, hidden service servers, etc.) to which or through which anonymous traffic flows. In a Tor network, hidden services are accessed based on secure descriptors via a distributed hash table stored in a database. The hidden service address table 114 serves a similar purpose, but has at least one very important distinction. Each virtual circuit endpoint entry 124 in the table 114 includes an address of a corresponding hidden service 126 and a mapping of the address 126 to a port-level channel 128. With respect to Tor or its similar brethren, the hidden service address 126 could include a network address (e.g., IPv4, etc.) as well as a public key pair. This approach provides an intimate binding between the anonymity protocol and the low-level, efficient communication offerings of the overall network fabric. Thus, the network fabric device 100 itself can operate as a host for the hidden service, operate as a relay for the anonymity network, operate as an introduction point for the anonymity network, operate as a rendezvous point, or operate as other types of nodes in the network.

Consider an example use case where a hidden web service offers real-time network monitoring information for management of the network fabric. A network manager can direct a Tor-enabled browser to one or more network fabric devices, where each device can include a hidden services address table. The table aids in directing the browser to a fabric device that operates as a rendezvous point. Similarly, the hidden web service hosted by another network fabric device can reach out toward the rendezvous point via other devices in a fabric operating as introduction points. As data passes through the established virtual circuit, the data is passed through each port of the devices according to the virtual circuit endpoints in the hidden service address table. Of particular interest, the port-level channel information indicates which specific channels should be used for the hidden web service (e.g., wavelengths, etc.).

The network fabric device 100 further includes a router module 120 that is configured to direct data packets from one port to another (e.g., ports 101-103 and 106-108). The router module 120 can operate as a standard cut-through routing switch according to the port forwarding table 112 in a manner that allows multiple instances of the fabric device 100 to operate essentially as a single distributed switching device. Such techniques are disclosed in the applicant's own work, as discussed in U.S. Pat. No. 7,352,745 to Perera et al., titled, "Switching system with distributed switching fabric", filed Dec. 13, 2006.

The router module 120 is configured to route packets associated with the hidden service. Based on the hidden service address table 114 information, the router module 120 is configured or programmed to map a virtual circuit related to the hidden service to its corresponding port-level channel of one of the device's ports 101-103 and 106-108. As referenced previously, this allows for binding high-level (e.g., network layer, etc.) anonymity protocols to the low-level communication services of the fabric. The router module 120 is further configured or programmed to route data, possibly based on a fixed-sized cell model as in Tor, associated with the hidden service between the virtual circuit and the port-level channel. This approach ensures other anonymity nodes in the anonymity network can leverage the services of the fabric, especially fabric-hosted hidden services, without requiring updates to their existing anonymity protocol implementations.

In some embodiments, the network fabric device 100 can also include one or more cryptographic modules 130 configured to provide cryptographic services (e.g., encryption, decryption, hashing, key storage, etc.; all suitable algorithms are contemplated). The cryptographic module(s) 130 could include a suitably configured FPGA, ASIC, software-hardware combination, or other type of component. The cryptographic module(s) 130 can be configured or programmed to secure the data packets that pass between the virtual circuit and the port-level channel. For example, the cryptographic module 130 can encrypt the data via 128-AES for a hop. Further, the cryptographic module 130 could decrypt the data for presentation to a locally hosted hidden service. Thus, the cryptographic module 130 encrypts (decrypts) data flowing from (to) the virtual circuit to (from) the port-level channel as well as the reverse process.

It should be appreciated that the cryptographic module 130 can also supply cryptographic services to generic port-level channel communications so that device-to-device communications occur over an encrypted channel, possibly as a port-to-port encrypted session. Such encrypted channels can be used in conjunction with or in support of the anonymity protocols, or independent of the anonymity protocol. Secure port-to-port sessions that can be suitably adapted for use with the disclosed subject matter are also disclosed in U.S. Pat. No. 7,548,556.

In additional embodiments of the network fabric device 100, the network fabric device 100 includes a hidden service manager module 140. The hidden service manager module 140 has roles or responsibilities that relate to managing aspects of the hidden services 142 affiliated with the fabric device 100. One management functionality includes updating the hidden services address table 114 as changes are made within the fabric. In some embodiments, hidden services 142 can be configured to migrate from network fabric to network fabric in a pseudorandom manner (e.g., according to a secure seed, etc.). Upon migration of the hidden services 142, the hidden service manager module 140 can update the address table 114. The manager module 140 could receive a new table from an external source, or could simply modify entries in the table 114 as necessary. Of particular note, the hidden service address 126 might not change under such a service migration. Rather, the port-level channel information would likely change to reflect a new path through which the migrated hidden service 142 can be accessed.

As illustrated, the fabric device 100 can be further configured or programmed to host the hidden service 142 within the device 100 itself. As shown, the hidden service manager module 140 could have responsibility for providing an execution environment in which the hidden service 142 can function. For example, the execution environment could include virtual machine (e.g., Python, JVM, etc.) running on top of the fabric device's 100 operating system (e.g., Linux, VxWorks®, etc.). A virtual machine approach allows a hidden service execution image to be moved from one device to another without concerns regarding hardware or operating system dependencies. Further, the hidden service 142 can be hosted on a port-level channel so that it appears as if it is actually hosted on the network. For example, the port-level channel could be a link layer for an IP stack having an IPv4 address on which the hidden service 142 is available via the anonymity protocol.

Virtual Circuits and Cut-Through Tunnels

Figure 2:
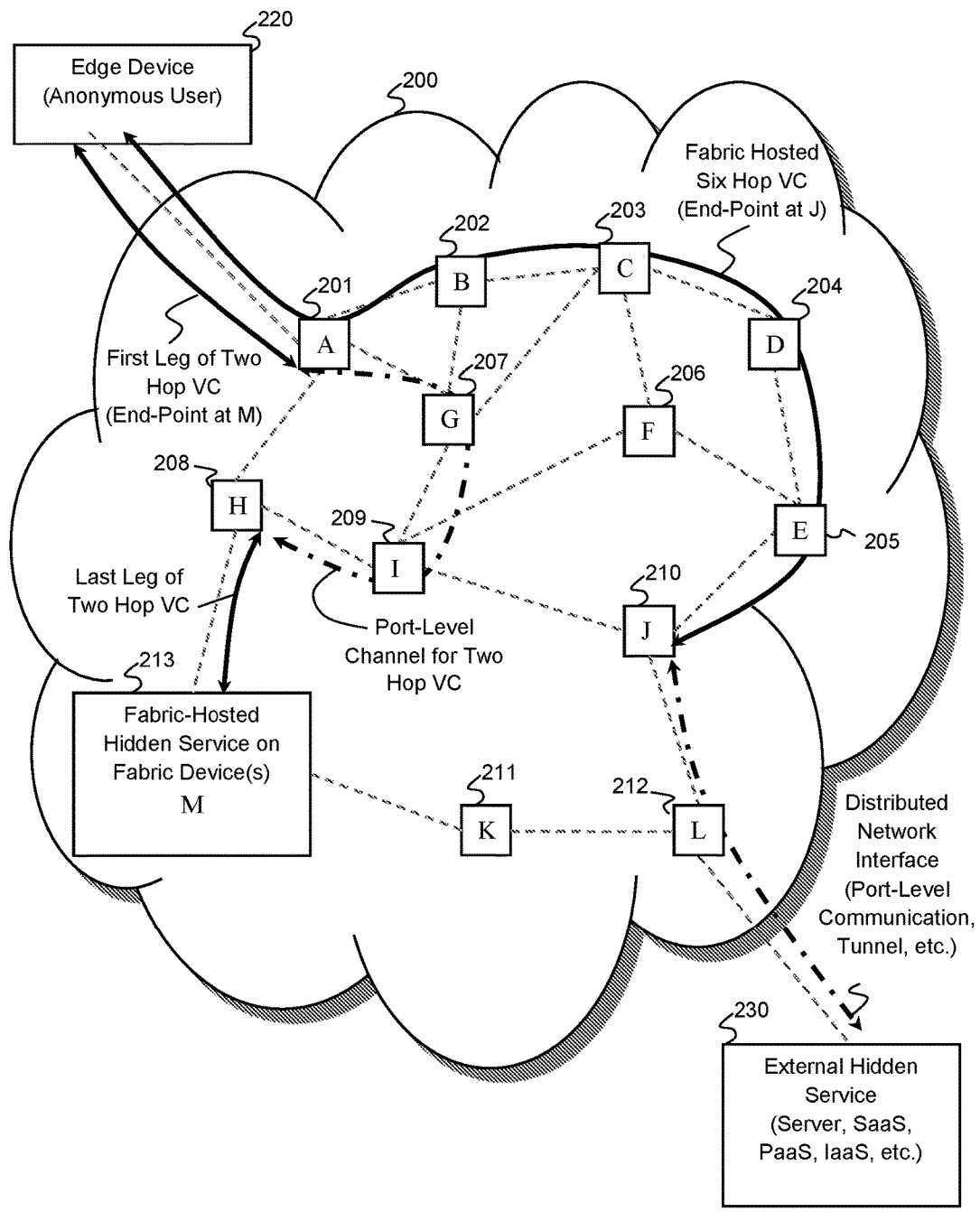
FIG. 2 illustrates network fabric augmentation of hidden service virtual circuits via port-level channel, cut-through routing.

The fabric device 100 described with respect to FIG. 1 gives rise to very interesting capabilities as discussed with respect to FIG. 2. FIG. 2 illustrates how a fabric 200 comprising network fabric devices 201-213 augments the virtual circuits through which hidden services can be accessed by edge devices (e.g., edge device 220). In the example shown, the edge device 220 is participating in an anonymity network (e.g., a Tor network) and accessing two hidden services over an anonymity protocol. The nodes 201-213 of the network fabric 200, labeled A-M, are also anonymity protocol aware. Thus, nodes A-M can be nodes, offer hidden services, or otherwise participate in the anonymity network while also operating as a generic transport fabric.

There are two hidden services shown as examples and that illustrate interesting features of the fabric. One hidden service 230 is external to the fabric and represents a traditional hidden service. The second hidden service is fabric-hosted on fabric node M (213). In both cases, the edge device 220 has established virtual circuits to the hidden services as represented by solid lines. The virtual circuits can be established using anonymity protocols; perhaps using an onion routing or telescoping path algorithm. However, each of the virtual circuits includes a port-level channel path through which data on the virtual circuits can pass, as represented by the dashed-dotted lines.

Referring to the external hidden service 230, one can consider the external hidden service 230 as being hosted by a traditional web-services computing device; a web server, perhaps. Further, the external hidden service 230 could be a cloud-based platform offering web services or computing capabilities via a Platform as a Service (PaaS), Infrastructure as a Service (IaaS), Software as a Service (SaaS), or other type of platform that is suitably enabled to engage the network fabric 200. In this example, the external hidden service 230 departs from traditional hidden services by comprising a distributed network interface (DNI). Techniques for establishing and using DNIs can be found in the applicant's own work discussed in U.S. patent application publication 2012/0166601 to Wittenschlaeger, titled, "Distributed Network Interfaces for Application Cloaking and Spoofing", filed Feb. 9, 2011.

The DNI allows the computing device on which the external hidden service 230 is hosted to extend its communication stack into the fabric itself. For example, node J (210), node K (211), and the computing device (the host of hidden service 230) collectively could form a link layer (node J), network layer (node K), and transport layer (the computing device) of the communication stack. From the perspective of the corresponding virtual circuit travelling through six hops (i.e., edge device 220 to A (201) to B (202) to C (203) to D (204) to E (205) to J (210)), the virtual circuit terminates at node J (210). Node J (210) stores a virtual circuit end-point having the external service's 230 hidden service address as well as the port-level channel that connects to the DNI of the external hidden service 230. Thus, from an edge device 220 perspective, node J (210) appears as the hidden service (if the edge device 220 could cut through all the encryption layers and uncover the actual address of the hidden service 230). From the perspective of the external hidden service 230 computing device, node J (210) appears as a link layer interface, an Ethernet port for example, and composes the distributed network interface of the hidden service. From the perspective of node J (210), node J's (210) router module routes data between the port-level channel and the virtual circuit.

As referenced earlier, the virtual circuit between the edge device 220 and the external hidden service 230 comprises six hops from the perspective of the anonymity protocol. It should be appreciated that each hop comprises a fabric device that presents itself to the anonymity protocol as host on the network rather than an infrastructure device (e.g., a switch, router, etc.). In embodiments employing Tor, nodes A, B, C, D, E, and J (nodes 201-205, and 210) instantiate a Tor node instance and have IPv4 addresses, thereby appearing as standard Tor nodes. Each node has virtual circuit end-points for its IPv4 address along with next hop information in the form of the corresponding port-level channels. This approach ensures the edge device is able to interact with the fabric using a standard implementation of Tor while also ensuring that each node only has, at best, next-hop information.

In view that each node 201-213 can operate both as an anonymity node as well as a network fabric infrastructural device, the fabric 200 can construct cut-through tunnels at a channel level while also respecting the number of hops required for communication. This is illustrated with respect to the fabric-hosted hidden service (on node 213) which uses a two hop virtual circuit. In this case, the two hops are from edge device 220 to node A (210) and then from node H (208) to node M (213) where the fabric-hosted hidden service resides. The intervening path from A (201) to G (207) to I (209) to H (208) represents a cut-through routing path operating at a port channel level. For example, the router modules of nodes G (207) and I (209) simply forward packets according to their port-forwarding table. Further, nodes G (207) and I (209), at least with respect to the edge device 220, are not participating in the anonymity protocol or network. Alternatively, rather than just being a two hop virtual circuit, the virtual circuit could be considered a five hop virtual circuit, where three hops and corresponding encryption occur at the port level rather than network level. This type of cut-through routing or support for the anonymity protocols reduces the latency experienced by the edge device 220 while also truly hiding the hidden service within the fabric.

Figure 3:
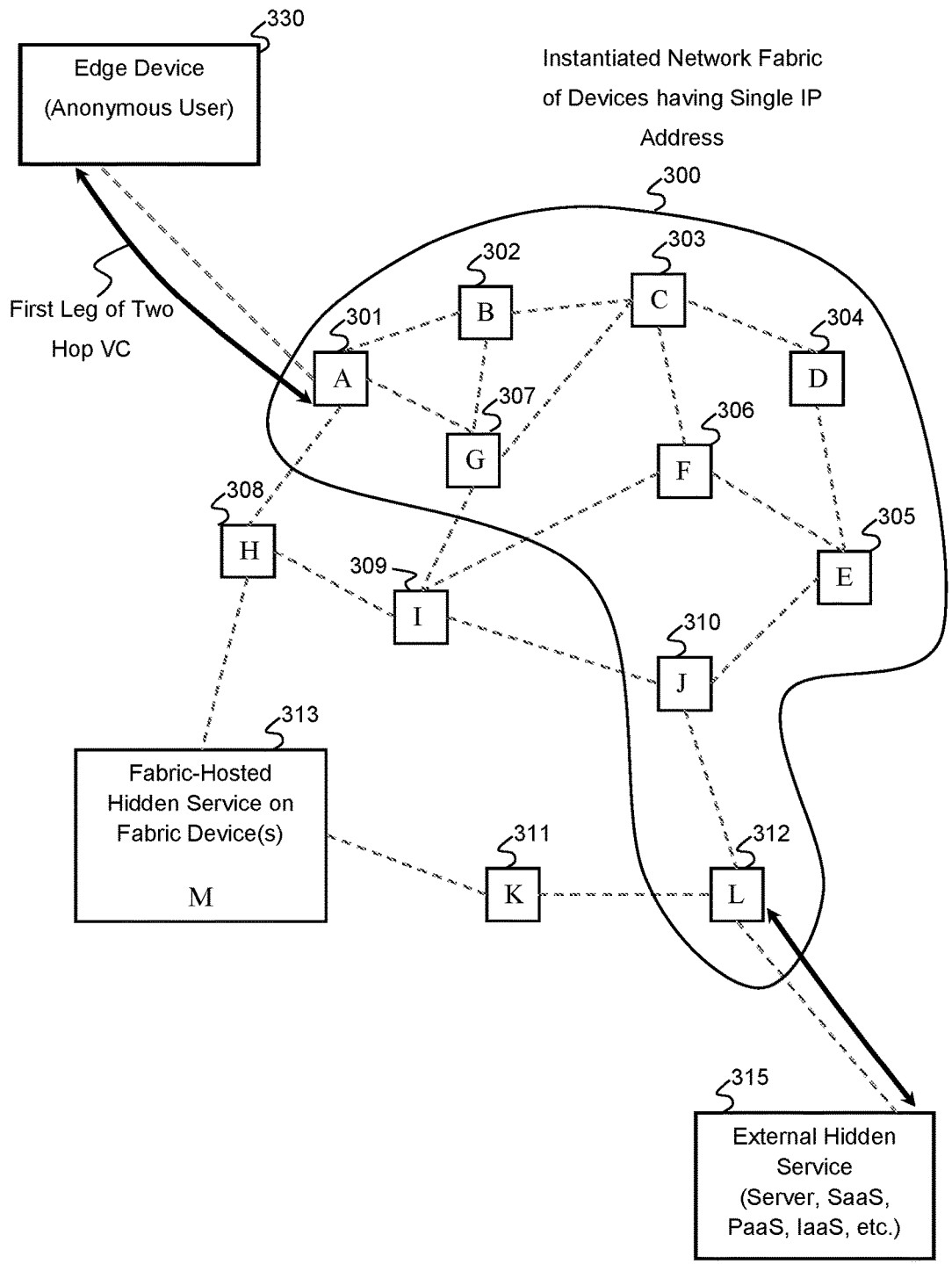
FIG. 3 illustrates an instantiated network fabric participating within an anonymity network.

Providing cut-through, port-level communications also give rise to very interesting features that augment, enhance, or could even replace features of an anonymity protocol. FIG. 3 illustrates an instantiated network fabric 300 participating within an anonymity network. Of particular note, the instantiated fabric 300 comprises less than the totality of nodes 301-313. In this example, a fabric manager, or even an application, has requested instantiation of a virtual fabric from available nodes. The instantiated fabric 300 can be provisioned as desired. For example, the instantiated fabric 300 can be optimized for minimized latency, alternatively the instantiated fabric 300 can be optimized for various degrees of security (e.g., anonymity, disaggregate packet routing, obfuscation, etc.), or optimized for other characteristics.

The example of FIG. 3 illustrates edge device 330 accessing external hidden service 315 via a two hop virtual circuit. The intermediary node of the two hop virtual circuit is, in fact, the entire instantiated network fabric 300 (i.e., nodes A-G (301-307), J (310), and L (312)), which has a single IP address. It should be appreciated, as mentioned previously, that the instantiated fabric 300 operates or appears as a single device although it comprises a distributed fabric. In view that the physical connections among the nodes 301-307, 310, and 312 can include optic fibers, it should be further appreciated that the nodes 301-307, 310, and 312 can be distributed over significant geographic distances (e.g., 5

Km, 8 Km, 10 Km, etc.). Thus, the single IP addressable fabric 300 could be considered as capable of spanning a continent or reaching across oceans.

Of particular relevance, the fabric 300 operates as a node within the anonymity network on multiple levels. First, the fabric 300 appears as just another anonymity network node. Second, and more importantly, the fabric 300 provides for transparent security at the fabric level. As packets enter the fabric 300, they can be routed according to numerous, varied, or varying routes. Thus, packets of a single virtual circuit can take different paths. Therefore, within the instantiated fabric 300, there is no centralized node through which the traffic flows, which reduces risk of exposing the anonymity node. Stated in a different way, the search space for identifying the operative node or nodes is distributed across geographic distances, rendering it nearly impossible for a threat to monitor, observe, or identify the anonymity node or its traffic.

Although the entire fabric 300 operates as an anonymity node, the actual processing of the anonymity packets or traffic can be localized to one or perhaps a few nodes. For example, node F (306) might be the processing node for the anonymity traffic by applying necessary cryptographic algorithms to the traffic. Traffic is shunted to and from node F (306) via cut-through paths. Still further, the functionality of the anonymity node can migrate from node-to-node, perhaps on a deterministic, pseudo-random basis. Such an approach further enhances security. An astute reader will appreciate that migration of the protocol functionality does not necessarily depend on the anonymity protocol, but could be leveraged for use with other protocols.

Yet another interesting aspect of the inventive subject that relates to the instantiated network fabric 300 is that the routing tables can be disaggregated or even dereferenced. In typical distributed fabrics, each node of the fabric stores a path image file comprising path information for all possible path configurations of the fabric. The path image file allows the nodes to determine the next hop for a packet, where the path image file includes next-hop information on how the node is to route packets toward a specified destination based on ingress-egress port pairs. Such a complete path image file in not necessary with respect to the disclosed instantiated network fabric.

In some embodiments, the routing tables (e.g., the path forwarding table, the hidden address table, etc.) can be disaggregated and spread over the nodes. Rather than a node having all path information in a table, the node could be provisioned with a routing table having pointers to other nodes that might have next hop information. Thus, when a packet arrives and is to be routed, the node forwards destination information from the packet to another node based on the pointer information (there can be an arbitrary number of nodes in a pointer chain up to a practical limit). The node having the actual next-hop information can then send a response back through the chain to the originating node. Once the originating node has the next-hop information, it can complete its routing task by forwarding the packet toward its destination via a specific port-level channel. The next-hop information can be transient in nature so that it is not persistently stored on the node. For example, the next-hop information could be stored within a reusable packet buffer, which gets rewritten over quickly rather than storing the next-hop information in a more permanent location.

As a more concrete example, perhaps node J (310) lacks next-hop information for all of its ports, but could include pointers to the other nodes. Node J (310) might include actual next-hop information from some of the other nodes; say nodes A (301), F (306), and E (305), for example. Further, node J's (310) disaggregated routing table might include additional pointers to one or more other nodes. For example, node J (310) might not have the actual next-hop information for node D (304), but might have a pointer to node L (312). In such a case when a request for node D (304) next-hop information arrives, node J (310) forwards the request to node L (312) for further processing. The system can quench loops of pointers by including a limit on the number of pointers in a chain or restricting construction of a pointer chain. Pointer chain loops could also be intentionally created to further obfuscate the path mapping tables.

Disaggregating and de-referencing routing tables has numerous advantages. One advantage is that no single node has all the routing information. Thus, if a node becomes compromised by a threat, the threat will lack a complete picture of the fabric. In a similar vein, if the node only has pointers to other nodes, then the threat will not be able to determine actual next-hop information for the compromised node. Yet another advantage includes the ability to configure the depth of de-referencing of next-hop information, which provides for an adjustable layer of security (at the expense of latency). Within the anonymity protocol, the number of de-references required could equate to a hop count, for example. Further, the size of the disaggregated routing tables is smaller than complete path image files, which reduces the time required to update the tables or copy tables from one node to another. Although the forgoing discussion relates to next-hop information, it should be understood that the disaggregated routing table can have various degrees of granularity from node down to port and even down to port-level channel.

The instantiated distributed fabric 300 of FIG. 3 also provides for very interesting latency management. Although Tor is designed to reduce latency, anyone who has tried to browse the web using the Tor browser bundle will attest to the fact that latency is still very much an issue, especially in real-time content (e.g., video, audio, game play, etc.). Unfortunately, Tor lacks the ability to fine-tune latency because it lacks control over the physical network. The instantiated distributed fabric 300 can be provisioned to be latency-aware, not only at the virtual circuit level, but down to the port-level channel path level. A latency manager, perhaps located on node E (305), can monitor the latency observed with the virtual circuit. Should the latency profile of the virtual circuit fall outside of a desired envelope, then the latency manager on node E (305) can adjust the paths through the instantiated distributed fabric 300 in a manner that is transparent to the virtual circuit configuration. The paths can be adjusted by updating or modifying the port forwarding tables in the nodes.

Adjusting paths at the port-level channel layer can have a dramatic impact on quality of service (QoS). By shifting traffic over to low-latency paths, the user at the edge device will experience improved performance. Alternatively, in the event that a threat is detected, the latency manager could route traffic through paths having very high latency. The reason for such an approach is to slow down the amount of information the threat is receiving so that there is time to identify or locate the threat while retaining the threat's attention.

Yet another aspect of latency management includes intentionally routing packets over different cut-through paths that have different latency profiles. As an example, consider the Tor protocol that sends data over virtual circuits using fixed-size cells of 512 bytes. The instantiated fabric 300 of FIG. 3 could disaggregate or break apart the fixed-size cells into multiple individual packets. Each packet can then be sent through the fabric 300 via its own path, where each path has an understood latency. The paths can be chosen so that the packets arrive at their destination in proper order so that reassembly of the fragmented cells is easily performed.

As a more concrete example, consider a case where node A (301) receives a cell from the first leg of the virtual circuit. Node A (301) fragments the cell into four packets (e.g., packet 1, 2, 3, and 4) of 64 bytes each; the size of the packets is arbitrary. Node A (301) routes packet 1 over a low latency route, then routes packet 2 over a slightly higher latency route. Node A (301) continues by routing packet 3 over yet a higher latency route and finally transmits packet 4 over the highest latency route of the set. Node L (312) then receives the packets in order and simply reassembles them in the order they arrive. Node L (312) then presents the reassembled cell to the virtual circuit of the external hidden service. This approach simplifies buffer management in the nodes while also increasing security by disaggregating packets and sending them over varied routes. Although this approach has utility as part of an anonymity protocol, it also can be leveraged with other protocols beyond anonymity protocols.

Tor allows users to establish a preferred number of hops (e.g., layers in the onion). The disclosed fabric devices and corresponding fabric provides for respecting the number of hops within the fabric itself, which gives rise to interesting capabilities. One interesting aspect that is not available within the Tor network is that users or fabric managers can have greater control over the nature of the virtual-circuit hops. A user or fabric manager could restrict hops based on one or more configuration parameters, perhaps based on geography. Consider a scenario where a corporate entity wishes to use Tor for secure communications, but does not want their communications to exit the geographic boundaries of the United States. The disclosed anonymity protocol aware fabric devices, via the hidden service managers or router modules, are able to configure the virtual circuits to respect the restriction by only using nodes identified in the USA.

Yet another interesting feature about the disclosed anonymity protocol-aware fabric is that the fabric operates as a distributed name service for hidden services. Each node in the fabric has a hidden service address table which can be leveraged by anonymous devices to access the hidden services without having to consult an edge device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An apparatus comprising:
   a plurality of network ports, each of the plurality of the network ports capable of supporting a corresponding port-level channel; and
   a router configured to at least:
      route network traffic among the plurality of network ports according to a port-forwarding table,
      map a virtual circuit related to a hidden service to a first port-level channel of a first port of the plurality of network ports according to a hidden service address in a hidden service address table, and
      route data associated with the hidden service between the virtual circuit and the first port-level channel.

2. The apparatus of claim 1, wherein the first port-level channel comprises an encrypted channel.

3. The apparatus of claim 2, wherein the encrypted channel comprises a port-to-port encrypted session.

4. The apparatus of claim 1, wherein the hidden service address comprises a network address and public key pair.

5. The apparatus of claim 1, wherein the plurality of network ports comprises at least one optic fiber port.

6. The apparatus of claim 5, wherein the virtual circuit maps to the first port-level channel at a specified wavelength on the at least one optic fiber port.

7. The apparatus of claim 5, wherein the at least one optic fiber port comprises at least one of a HiGIG port, a HiGIG+ port, or a HiGIG2 port.

8. The apparatus of claim 1, wherein the plurality of network ports comprises at least one Ethernet port.

9. The apparatus of claim 8, wherein the virtual circuit maps to a second port-level channel at a MAC address of the at least one Ethernet port.

10. The apparatus of claim 9, wherein the at least one Ethernet port comprises at least one of a 10 Mbps port, a 100 Mbps port, a 1000 Mbps port, or a 10 Gbps port.

11. The apparatus of claim 1, further comprising a hidden service manager module configured to at least update the hidden service address table.

12. The apparatus of claim 11, wherein the hidden service manager module is configured to at least update the hidden service address table upon a migration of the hidden service.

13. The apparatus of claim 11, wherein the hidden service manager module is configured to at least host the hidden service.

14. The apparatus of claim 13, wherein the hidden service is hosted on the first port-level channel.

15. The apparatus of claim 1, wherein the first port-level channel comprises a distributed network interface of the hidden service.

16. The apparatus of claim 1, wherein the hidden service address table comprises a distributed hash table.

17. The apparatus of claim 1, further comprising a cryptographic module configured to at least secure the data between the virtual circuit and the first port-level channel.

18. The apparatus of claim 17, wherein the cryptographic module is configured to perform at least one of decrypting data flowing from the first port-level channel to the virtual circuit or encrypting data flowing from the virtual circuit to the first port-level channel.

19. The apparatus of claim 1, wherein the router is further configured to at least package the data into fixed size cells before routing the data over the first port-level channel.

20. The apparatus of claim 1, wherein the virtual circuit comprises an onion routing path.

21. The apparatus of claim 1, wherein the virtual circuit comprises a telescoping circuit.

22. The apparatus of claim 1 comprising, or comprised in, a network fabric device.

23. The apparatus of claim 1 further comprising a memory including a hidden service address table capable of storing virtual circuit endpoints that include the hidden service address and the first port-level channel, the memory further including the port-forwarding table.

\* \* \* \* \*